United States Patent

Kuder et al.

Patent Number: 5,255,336
Date of Patent: Oct. 19, 1993

[54] INJECTION MOLDED OPTICAL COUPLING ELEMENTS

[75] Inventors: James E. Kuder, Fanwood; Kevin F. Manning, Peapack, both of N.J.

[73] Assignee: Hoechst Celanese Corp., Somerville, N.J.

[21] Appl. No.: 870,652

[22] Filed: Apr. 20, 1992

[51] Int. Cl.⁵ .......................... G02B 6/00; G02B 6/36
[52] U.S. Cl. ........................................ 385/46; 264/1.5
[58] Field of Search ...................... 264/1.5; 385/39, 46

[56] References Cited

U.S. PATENT DOCUMENTS 4,484,794  11/1984  Witte ................................. 385/46
4,979,972  12/1990  Berkey et al. ................. 385/39 X
5,035,480   7/1991  Dutt ................................. 385/46 X
5,113,460   5/1992  Hakoun et al. ..................... 385/39

Primary Examiner—Akm E. Ullah
Attorney, Agent, or Firm—Michael W. Ferrell

[57] ABSTRACT

A unitary injection molded waveguiding optical element is disclosed and claimed. In a preferred embodiment, there is shown an NXN star coupler 310 with a plurality of fibers 314, 316 integrally formed with the mixing body. Preferably, the fibers are continuously transitioned to the signal mixing body such that the optical path is substantially constant and the surfaces are free from lateral discontinuities.

20 Claims, 6 Drawing Sheets

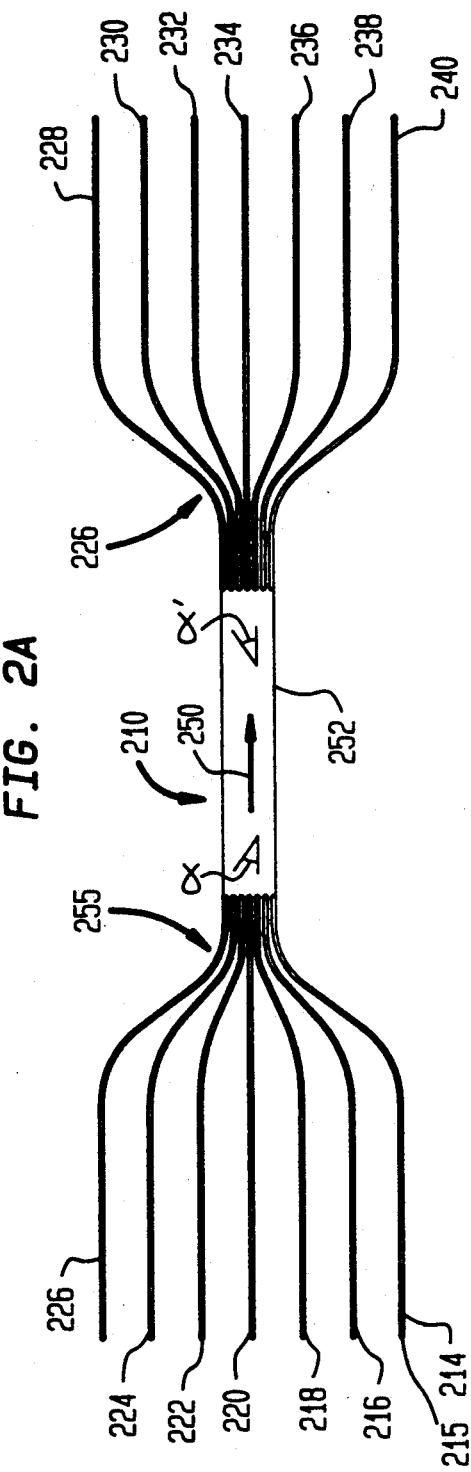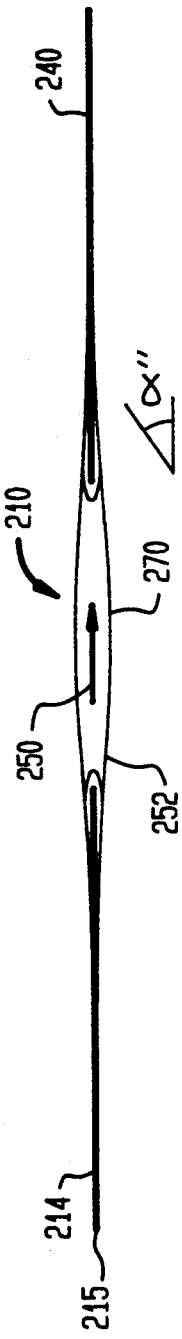
FIG. 2A
FIG. 2B

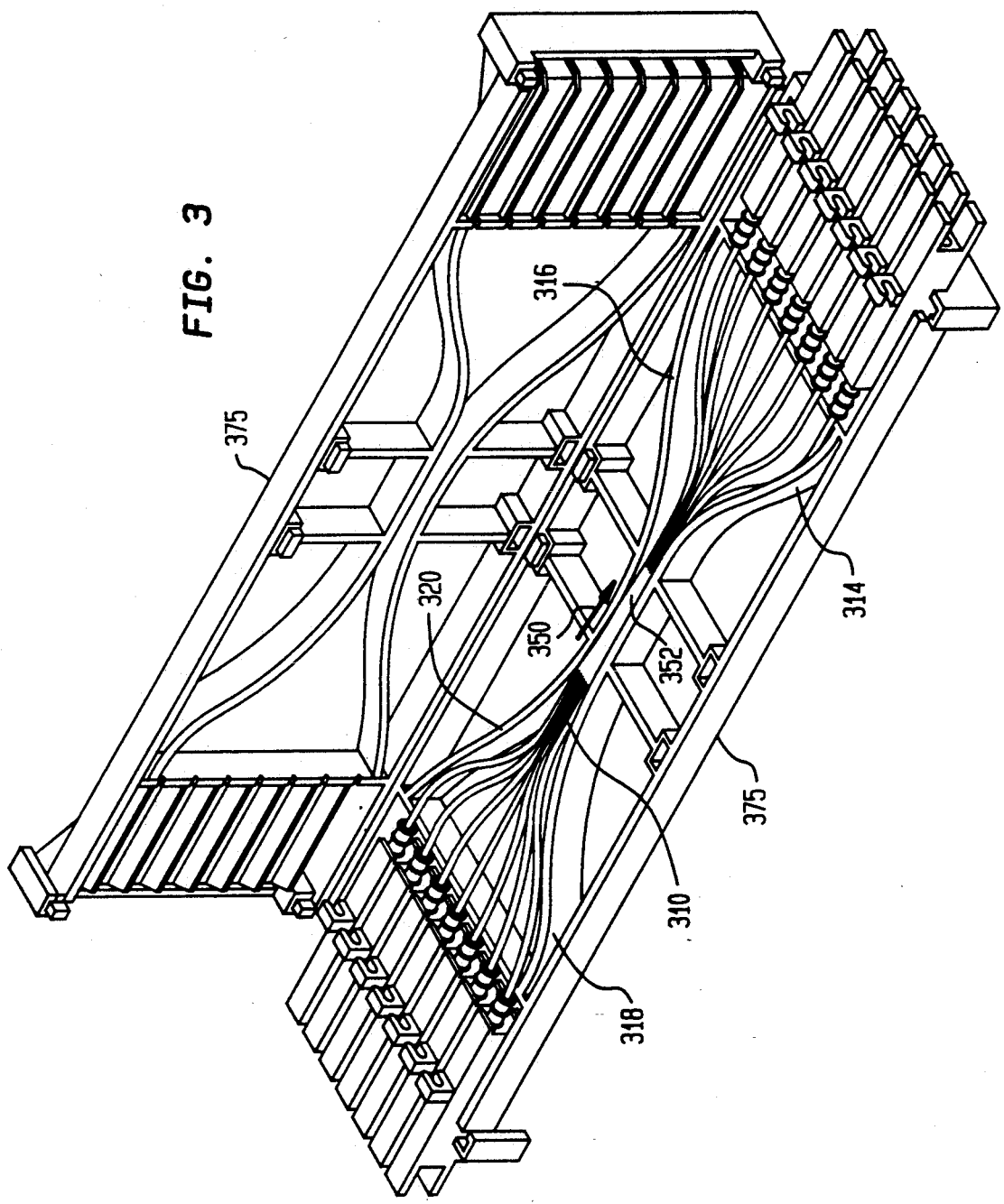

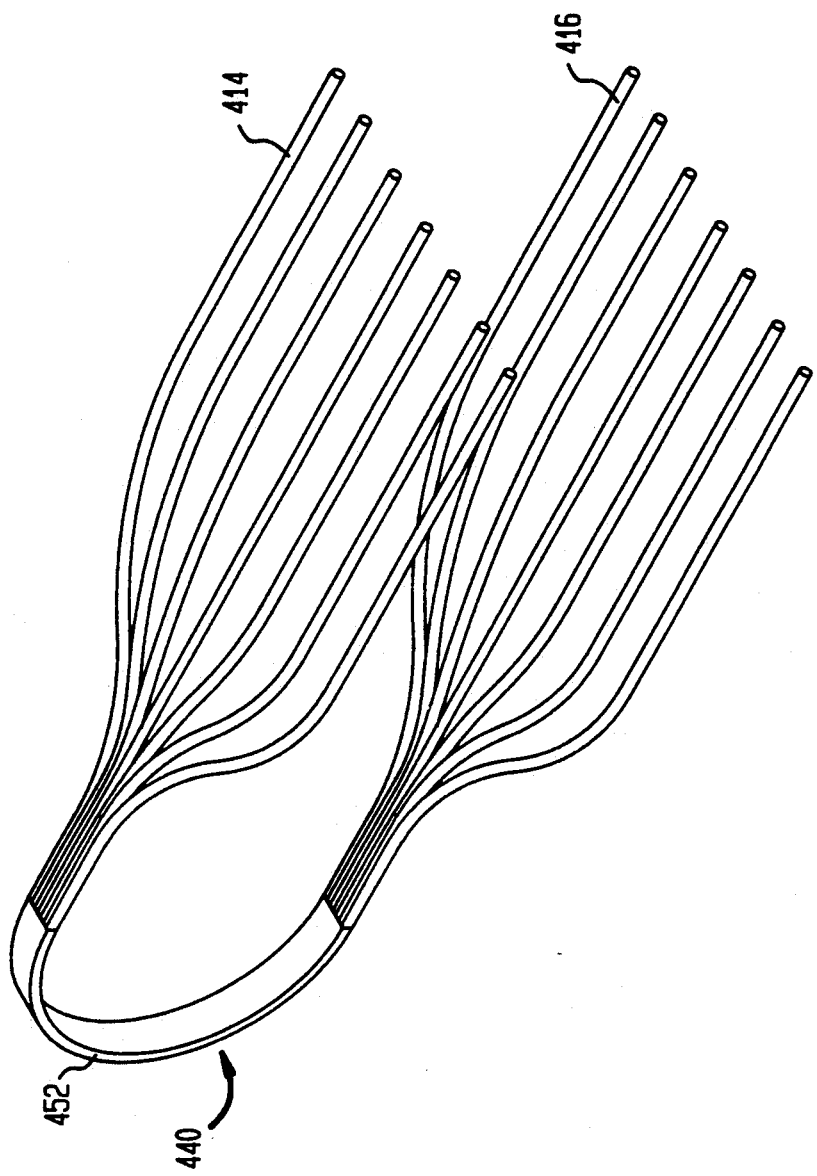

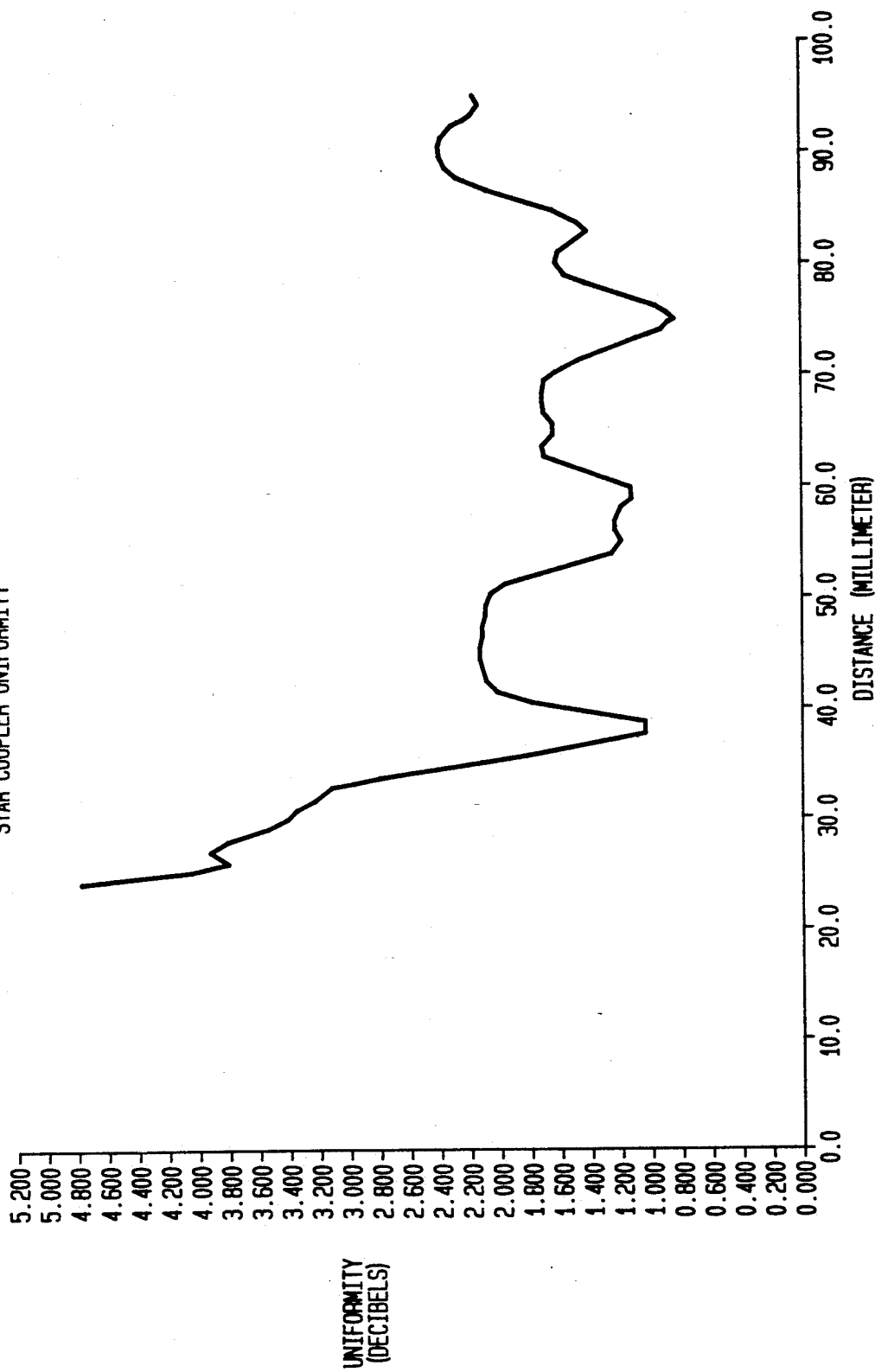

INJECTION MOLDED OPTICAL COUPLING ELEMENTS

TECHNICAL FIELD

The present invention relates generally to optical couplers, and more specifically to injection molded optical elements having molded optical junctions with at least an integrally formed input or output portion projecting outwardly from the coupler body defining an angle less than about twenty five degrees with the propagation axis of the element and a continuous waveguiding profile, that is, free from lateral discontinuities.

BACKGROUND OF INVENTION

Passive devices for coupling optical signals are well-known to those of skill in the art. U.S. Pat. No. 4,590,619 to Weiner discloses a star coupler for an optical data bus system including a plurality of incoming and outgoing optical waveguides. In one embodiment, the coupler includes a mixing plate fitted with parallel oriented input and output fibers.

U.S. Pat. No. 4,995,692 discloses and claims an optical star coupler based on a curved optical ribbon as the mixing element. Optical fibers are optically connected to the ribbon element by way of a multi-apertured block.

U.S. Pat. No. 4,484,794 to Witte et al. shows a multi-layer star coupler wherein optical fibers are optically coupled by preparing three multi-layer structures followed by cementing them together. Similarly, a multi-piece mixing element may be found disclosed in U.S. Pat. No. 4,653,845 to Tremblay et al.

Optical mixing elements having a rectangular body with a thickness approximately equal to that of an optical fiber have been suggested in U.S. Pat. No. 4,449,783 to Witte. Such elements are reported to have relatively low insertion loss, but may in fact be as tedious to fabricate as the bundle-type star coupler taught by Coutandin et al., See U.S. Pat. No. 4,919,851.

In International Publication No. WO 90/08030 there is disclosed a star coupler partially made by way of an injection molding process. In accordance with the '030 publication, a coupler is molded in the negative in the sense that channels are defined by way of a molded body, which channels are then filled with a suitable optically clear material. In use, the material filling the channel is operative as a waveguide core material and the injection molded body is intended to function as cladding.

Despite substantial improvements in the field, known optical signal couplers tend to have unacceptably high losses, nonuniform signal distribution, or are inordinately difficult to fabricate.

SUMMARY OF INVENTION

It has been found that unitary optical coupling devices can be formed in a single step by injection molding. Devices in accordance with the present invention are substantially free from lateral discontinuities (surfaces perpendicular to the desired direction of light propagation) as would be the case, for example, when affixing cylindrical optical fibers to a rectangular light mixing body, such as a slab. Moreover, devices in accordance with the present invention are relatively inexpensive to fabricate and may be integrated into optical systems by ordinary fiber-to-fiber connectors as are readily available.

In a typical embodiment, there is provided a unitary injection molded optical junction element including a light-propagating member or body with a propagation axis, having integrally formed with the body at least one light coupling portion operable to couple light into the body and projecting outwardly therefrom. The light coupling portion forms an angle of generally about twenty five degrees or less with the axis of the light propagation member and is smoothly transitioned into the member so that the junction is free from lateral discontinuities which adversely affect device performance. The above noted angle is typically less than about fifteen degrees, less than ten degrees being particularly preferred.

In a preferred embodiment, a unitary injection molded coupling device is provided with multiple input and output ports each of which is defined at relatively small angles on a continuous profile as described above. Such devices may be constructed with optical fibers integrally molded with the coupler body and may be separated by way of an arcuate construction. If the bend radius is relatively large, propagation losses can be minimized as described hereinafter.

The body of the mixing body may have a variety of shapes including cylindrical, polygonal or rectangular. In general, mostly amorphous polymers such as suitable vinyl polymers, polycarbonates, or polyimides are preferred. Thermoplastic polycarbonates and polymethylmethacrylates are in general believed expedient. Optical plastics, including polymethyl methacrylates, polystyrenes polycarbonates, methyl methacrylate styrenes, styrene acrylonitriles and acrylonitrile-butadiene-styrenes useful in connection with the present invention are listed in Lasers & Optoelectronics, December, 1990 in an article entitled "Plastic Optics: Challenging the High Volume Myth". The optical element may be provided with a cladding layer if so desired, which layer is of lower refractive index than the injection molded optical element to promote effective waveguiding.

In a particularly preferred embodiment, an NXN star coupler is provided with fibers with diameters of about 0.5 to about 2 millimeters at their termini. The fibers are continuously transitioned to the signal mixing body so that the overall optical path is substantially constant as shown for example in FIG. 2B.

BRIEF DESCRIPTION OF DRAWINGS

The invention is described in detail below with reference to the several figures wherein like numerals designate similar parts and in which:

FIG. 2(a) is a plan view of coupler molded in accordance with the present invention and FIG. 2(b) is a view in elevation thereof;

FIG. 3 is a perspective view of an optical coupler of the present invention mounted in a case and provided with standard optical connectors;

FIG. 4 is a perspective view of an alternate embodiment of the present invention;

FIG. 5 is a plot of signal uniformity vs. signal mixing body length for a 7×7 star coupler such as that shown in FIG. 3.

DETAILED DESCRIPTION

The invention is described in detail hereinafter in connection with several embodiments which exemplification is for purposes of illustration only. Various modifications will be readily apparent to those of skill in the art, for example, a suitable polyarylate could be substituted for the polycarbonates and polymethylmethacrylates of the specific examples.

Figure 1:
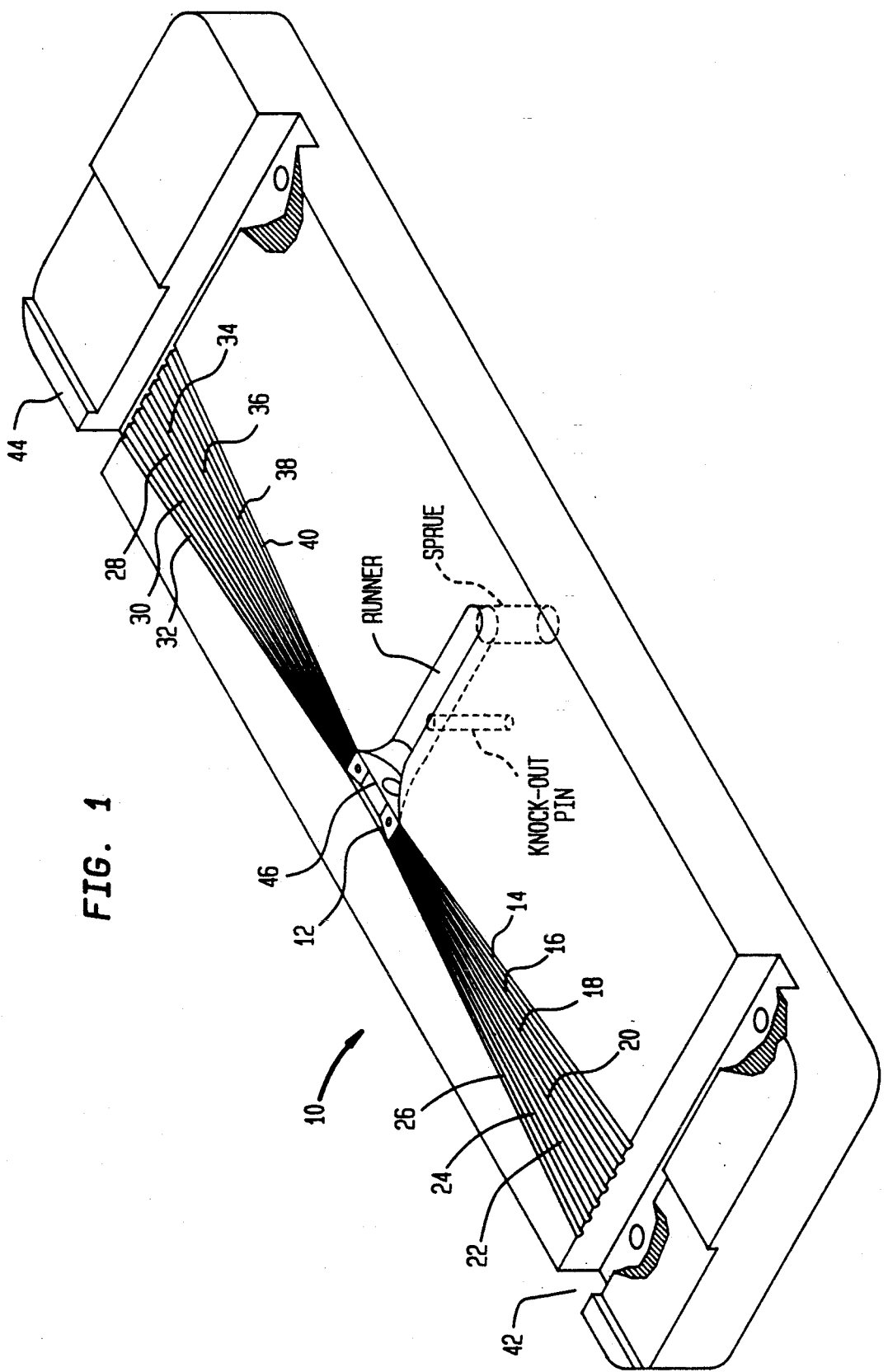
FIG. 1 is a perspective view of a mold platen used to fabricate a unitary coupler in accordance with the present invention.

Turning to FIG. 1, there is shown in a perspective view one-half of a mold 10 which is used to produce optical elements of the present invention. Preferably the mold is made from a high grade material such as CSM-21 pre-hardened stainless steel which is highly polished to provide for smoothest possible finish. Alternatively, Stavax 420ESR stainless steel made by Uddeholm (Sweden) which is a preferred cavity metal for optical part molding of lenses, optical disks etc, may be used. After polishing, surface of cavity 10 should have surface r.m.s. roughness of about 50Å for optical applications. Scattering losses due to surface features imparted by the mold such as parting lines and marks left by ejector pins should be minimized.

Mold 10 and its mating element (not shown) may be mounted on any standard mold frame for use on an injection molding machine; for example it may be used on a standard machine such as an Arburg Allrounder 750-210-320 D molding machine fitted with a 25 mm screw.

Mold 10 is provided with a central cavity 12 extending to a plurality of extremity portions 14, 16, 18, 20, 22, 24, 26, 28, 30, 32, 34, 36, 38, 40 such that the mold is suitable to make a 7×7 star coupler. Mounting slots 42,44 are provided to affix the mold to a frame as discussed above. The mold 10 of FIG. 1 is provided with a single centrally located gate 46 which is used to fill the mold cavity with polymer.

The polymer chosen preferably has intrinsically low optical losses and suitable rheological characteristics. Typical polymers include optical grades of polymethylmethacrylate and polycarbonate such as those grades used to make compact disks.

Alternatively, amorphous polyarylates such as copolymers of bisphenol A and aromatic diacids for example the Durel ® polyarylate marketed by Hoechst Celanese Corporation may be used as well as the polymers listed in Lasers and Optoelectronics discussed above. Generally speaking, any suitable amorphous normally non-crystalline polymer could be used.

Several considerations are critical to the desired end product, including both optical and processing considerations. With respect to processing, the pressure drop from gate 46 to the end of the part should not exceed the injection pressure capability of the machine. Generally speaking, the pressure drop is given by the Pousielle equation:

$$\Delta P = \frac{12 \mu L Q}{W h^3}$$

where $\mu$ is the viscosity of the polymer melt, L is the length of the flow passage, Q is the flow rate of the melt, W is the width of the flow passage and h is the height of the flow passage. As can be seen, long narrow cavities are much harder to fill than cavities with larger cross sections.

The features of mold 10 will be appreciated by reference to FIGS. 2(a) and (b) which are a plan view and a view in elevation respectively of an optical coupler injection molded using a mold of the general type as is shown in FIG. 1.

7×7 Coupler 210 defines generally a propagation axis indicated generally by arrow 250 along its length along which light propagates when the device is in use. The input/output ports 214 through 240 emanate from a main body 252 which is about 50 mm in length, 7 mm in width, and about 3 mm in thickness at the thickest central region. Each input/output port 214 through 240 has a circular cross section at its terminus, such as a terminus 215, of about 1 mm in diameter such that its outer portion is essentially a polymer optical fiber. The outer portions are smoothly transitioned to the rectangular body as shown such that they have a roughly 1½×1 mm rectangular cross section by the time they join rectangular body 252 at regions 255, 266 some 70-80 millimeters from their ends as required for attachment of connectors without imparting twist to the coupler and forcing them from coplanarity. Since coupler 210 is integrally formed in a single injection molding step, there are no joints.

In order to minimize optical losses, it should be noted that the junctions defined by the input/output ports at regions 255,266 are free from lateral discontinuities, that is there are no surfaces projecting in a direction perpendicular to propagation axis 250 except of course at the ends of the fibers. Moreover, each of the angles $a$, $a'$ representing the angles the individual inputs and outputs 214, 216, 218, 220, 222, 224, 226, 228, 230, 232, 234, 236, 238 and 240 make with the axis 250 of signal mixing body 252 in the general areas 255, 266 are relatively small, less than about 25 degrees.

FIG. 2(b) is a side view of the coupler of FIG. 2(a). As can be seen, the device 210 has a tapered longitudinal profile, being thickest around central region 270. Because of the long length and small taper angle $a''$, the optical path is substantially constant. Again, it can be seen that there are no lateral surface projections (perpendicular to axis 250). In addition, the added thickness about the central region makes the part easier to mold since the pressure drop is inversely dependent on the thickness of the coupler.

The longitudinal taper $a''$ is generally kept less than 25 degrees, less than 15 degrees being typical and less than 10 degrees being the most preferred.

FIGS. 3 and 4 illustrate a coupler mounted in a case and an alternate embodiment of the inventive optical coupler respectively. There is shown in FIG. 3 a 7×7 star coupler 310 of the same general type shown in FIG. 2 with a plurality of curved input/outputs such as fibers 314, 316, 318 and 320 integrally formed with the signal mixing body 352.

The curved fibers make it possible to shorten the length of the coupler so that it is more compact. Although this introduces a tortuous optical path into the system, the radius of curvature for the curved paths should be sufficiently large so that the bend loss (defined in EIA Standard 455-62 as method B only) remains less than about 0.4 decibels and more preferably less then about 0.2 decibels. For the dimensions of the device of FIG. 3 (e.g. about 1 mm diameter in the fiber portions), the radius of curvature for the curved fibers should be about 20 millimeters or more. Likewise, to achieve reasonable uniformity, the mixing body 352 should have a length of 40 mm or more.

Device 310 is fitted into a custom enclosure 375 which may be formed of any suitable material. The ends of the fibers such as fibers 314, 316 are fitted with standard DNP connectors (available from Amp, Inc.) which fit securely into enclosure 375 so that coupler 340 may be readily integrated into a fiber optic system.

FIG. 4 shows yet another embodiment of the present invention wherein the mixing body 452 of the 7×7 coupler is curved so that it will fit compactly into a cube-like enclosure. The curvature may be achieved by way of a multi-part mold, or the device 440 could be molded flat and later curved by heating the device and wrapping it around a cylindrical body.

If so desired, any of the devices of FIGS. 2–4 can be provided with an outer cladding layer having a lower refractive index than the inner or core material. Particularly useful materials for this purpose include ultraviolet-curable resins that are commercially available. As noted hereinafter, such a cladding material improves device performance.

Geometric considerations as relating to device optical performance are oftentimes critical. For example, attenuation due to a signal split at a y-junction of 1 mm diameter increases rapidly and becomes unacceptably high when the angle between the outputs exceeds about 50 degrees. Preferably angles at optical junctions (that is, when the input extremities join the mixing body 352) are thus kept within about 25 degrees of the propagation axis 350 of devices of the present invention and more preferably less than about 15 degrees. Less than about 10 degrees is particularly preferred.

Similarly, for a device such as that shown in FIG. 3, it can be shown that the signal uniformity reaches an optimal value of about 1 decibel when the mixing body is at least about 40 mm in length as shown in FIG. 5. The uniformity in an NXN coupler is defined as:

$$\Delta\alpha(\text{decibels}) = 10 \log\left(\frac{P_{max}}{P_{min}}\right)$$

where Pmax=the highest power output at a given output port and Pmin=the lowest power output at a given output port under a given set of input conditions; while $\Delta\alpha$ is the uniformity, in decibels.

Figure 6:
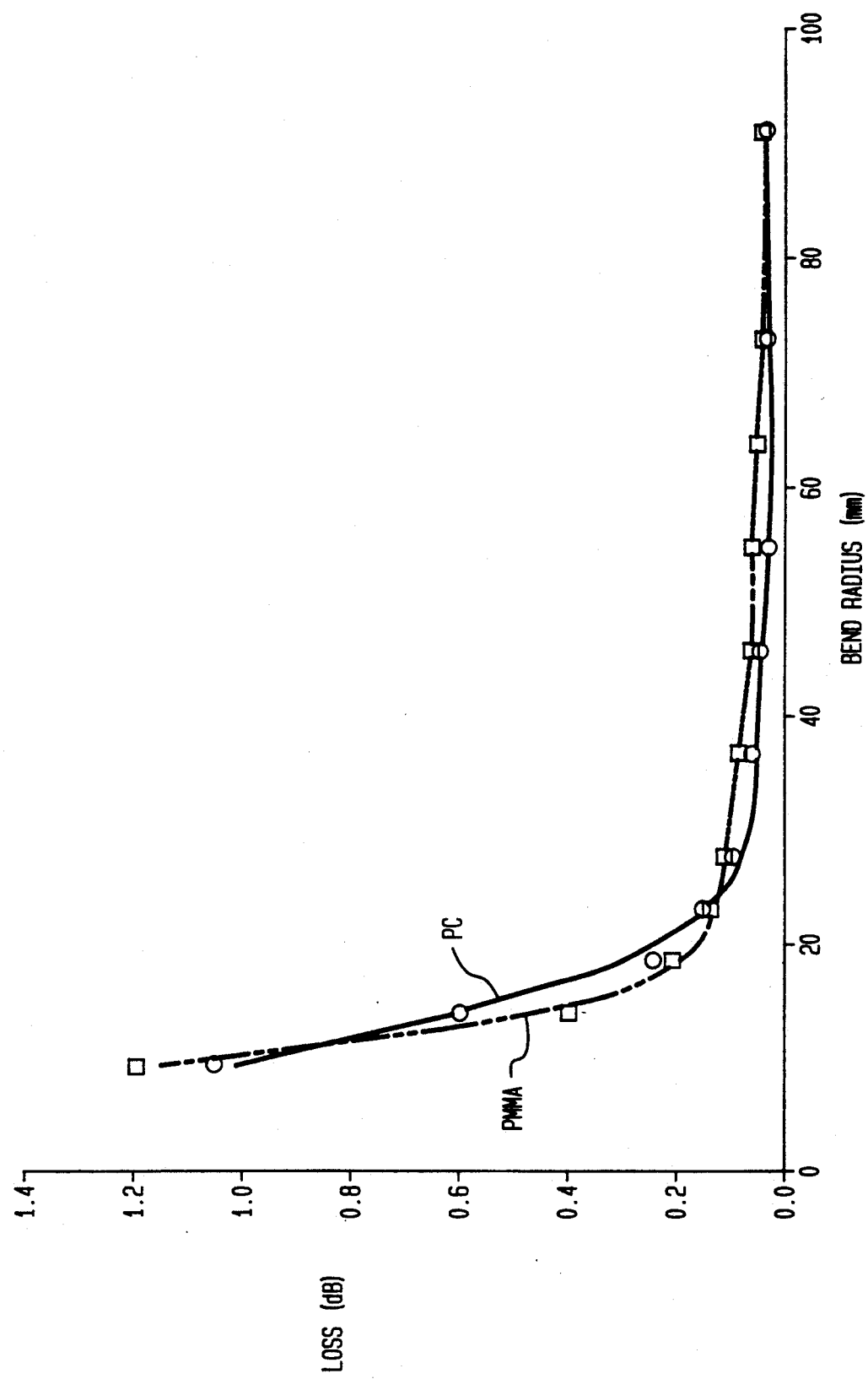
FIG. 6 is a graph of bend loss vs. radius of curvature for curved optical fibers such as those integrally formed with the mixing body shown in FIGS. 2 and 3.

Bend loss due to a curved path, such as that shown in the integrally molded fibers of the device of FIGS. 2, 3 and 4 follows the relationship of FIG. 6 which is a plot of bend loss vs radius of curvature for a 1 millimeter fiber. Thus, it is preferred to keep the radius of curvature of molded parts such as fiber 314 large enough that the bend loss is 0.4 decibels or less and preferably less than about 0.2 decibels. The same is achieved in one millimeter fibers when the radius of curvature is less than about 20 mm. As used herein, bend loss refers to that optical attenuation in excess of that of a corresponding straight fiber.

Besides uniformity, another important performance parameter for optical coupling elements is excess loss defined by the equation:

$$\alpha_{xs} = -10 \log\left(\Sigma \frac{P_i}{P_o}\right)$$

where $\alpha_{xs}$ is the excess optical loss in decibels with respect to power put into the device, $P_i$ is the output at the ith port and $P_o$ is the total optical power input into the device.

MEASUREMENTS

In the examples which follow measurements were made using a custom built test setup from General Fiber Optics, Inc. and consisting of a sending and a receiving unit which are interfaced with a personal computer. During a characterization test, an LED in the sending unit launches 660 nm light into each of the input fibers while the light intensity emerging from each of the output fibers for a given input is measured by photodiodes in the receiving unit. This information is processed by the computer according to the definitions given above to afford the performance characteristics of the coupler. The light intensity through a low loss PMMA fiber whose length is equal to that of the coupler is taken as intensity of light launched into each input fiber.

Example 1

A mold design of the FIG. 1 was mounted on an Arburg Allrounder 750 210-320D molding machine. Makrolon CD 2005 polycarbonate from Mobay was dried and then molded under the following conditions:

| Mold Surface Temperature | 170° C. |
|---|---|
| Nozzle Temperature | 305° C. |
| Injection Time | 6 Seconds |
| Total Cycle Time | 18 Seconds |

The resulting part (as shown in FIG. 2) had an excess loss ($\alpha_{xs}$) of about 5.7 dB and a uniformity of about 0.9 dB.

Example 2

A mold of the general type shown in FIG. 1 for a 7×7 star coupler as shown in FIG. 3 was mounted in an Arburg Allrounder 750-210-320D molding machine. Makrolon CD 2005 polycarbonate from Mobay Corporation as in Example 1 was dried for 4 hours at 225° F. and then molded at the following settings:

| Barrel Temperature | rear 250° C., middle 285° C., front 285° C. |
|---|---|
| Nozzle Temperature | 305° C. |
| Mold Temperature | 170° C. |
| Injection Time | 6 Seconds |
| Cooling Time | 10 Seconds |
| Total Cycle Time | 18 Seconds |
| Injection Pressure | 33,000 psi |
| Screw Speed | 150 rpm |
| Ram Speed | Fast |

In this run, the ends of the molded part were, in general, not completely filled. The couplers obtained were fitted with DNP connectors on the fiber ends and evaluated using the test apparatus described above. In one example, typical of the results obtained, the measurement was made on the same molded piece after degating with a razor blade, again after polishing the gate area, and a third time after coating the mixing zone of the coupler with UV-11-3 UV-curable resin (refractive index 1.53) from Master Bond Inc. The measured quantities after each of these steps were:

|  | Excess Loss | Uniformity |
|---|---|---|
| Initial | 0.9 dB | 7.0 dB |
| After Polishing | 10.2 dB | 5.9 dB |
| After Coating | 10.3 dB | 4.7 dB |

Example 3

One of the couplers from the lot described above was evaluated before and after annealing 14 hours under nitrogen at a temperature of 100° C. The optical characteristics of the coupler were:

|  | Excess Loss | Uniformity |
|---|---|---|
| Initial | 8.5 dB | 3.9 dB |
| After Annealing | 9.0 dB | 4.2 dB |

Example 4

One of the couplers from the lot described in Example 3 was evaluated before and after bending into a U-shape by heating over a 2-inch diameter copper tube. The optical characteristics of the coupler were:

|  | Excess Loss | Uniformity |
|---|---|---|
| Initial | 7.9 dB | 3.2 dB |
| After Bending | 9.8 dB | 3.3 dB |

Example 5

In order to achieve more the mold cavity, the gate was enlarged from 4 mm to an 8 mm fan shape and the venting at the fiber ends was increased from 0.5 mil to 1 mil. In addition, to decrease optical loss the ejector pins (not shown) located at mixing zone 352 of the coupler were plugged and polished. The Arburg Allrounder molding machine was again used at these settings:

| Barrel Temperature | rear 280° C., middle 292° C., front 294° C. |
|---|---|
| Nozzle Temperature | 310° C. |
| Mold Temperature | 235° C. |
| Injection Time | 6 Seconds |
| Cooling Time | 30 Seconds |
| Injection Pressure | 35,000 psi |
| Ram Speed | Fast |
| Screw Speed | 140 rpm |

For three of the couplers obtained from this lot, excess loss was in the range 8.5–9.6 dB and uniformity in the range 4.2–4.7 dB. A coupler coated with UV-11-3 cladding layer had excess loss 9.6 dB and uniformity 7.1 dB.

Example 6

Following the general procedure described above, the same 7×7 coupler was molded using Plexiglass ® VLD-100 NA, an optical quality polymethyl methacrylate available from Rohm and Haas.

| Barrel Temperature | back 230° C., middle 250° C., front 270° C. |
|---|---|
| Injection Time | 1 Second |
| Injection Pressure | 1470 psi |
| Hold Time | 6 Seconds |
| Mold Temperature | Room Temperature |
| Cooling Time | 6 Seconds |

As can be seen from the foregoing examples, the optical coupling devices in accordance with the present invention exhibit generally high quality optical distributive properties as well as waveguiding characteristics.

We claim:

1. A unitary injection molded waveguiding optical element comprising a light-propagating body member defining a propagation axis and integrally formed therewith at least one light coupling portion thereof, said light coupling portion projecting outwardly from said body member and being operable to couple light with said light propagating member, said light coupling portion being arranged such that it forms an angle of about twenty five degrees or less with said propagation axis of said light-propagating member, said light propagating member and said light coupling portion defining an optical junction substantially free from lateral discontinuities such that said junction has a continuous waveguiding profile in the direction of propagation.

2. The optical element according to claim 1, wherein said body member has a polygonal cross section.

3. The optical element according to claim 2, wherein said body member is of rectangular cross section.

4. The optical element according to claim 1, wherein said light coupling portion forms an angle of about fifteen degrees or less with said body member.

5. The optical element according to claim 1, wherein said light coupling portion forms an angle of less than about ten degrees with said body member.

6. The optical element according to claim 1, wherein said element is formed from an amorphous polymer.

7. The optical element according to claim 6, wherein said polymer is thermoplastic.

8. The optical element according to claim 7, wherein said element is formed from a vinyl polymer.

9. The optical element according to claim 8, wherein said polymer is polymethylmethacrylate.

10. The optical element according to claim 7, wherein said polymer is a polycarbonate.

11. The optical element according to claim 1, wherein said optical junction is provided with a cladding layer.

12. A unitary injection molded optical coupling device having multiple input/output ports comprising in combination a light-propagating member having a propagation axis and integrally formed therewith a least three light ports defined by light coupling portions integrally formed with said light-propagating member and projecting outwardly therefrom, said light coupling portions being arranged such that they form an angle of twenty five degrees or less with the propagation axis of said light propagating member and at least two of which are adjacent one another such that said coupling device distributes an incoming signal to said adjacent ports with a signal uniformity of ten decibels or less and wherein said light coupling portions and said polygonal light-propagating member are substantially free from lateral discontinuities such that said ports form a continuous waveguiding profile along the propagation direction.

13. The optical element according to claim 12, wherein said optical element exhibits a signal uniformity of five decibels or less.

14. The optical element according to claim 13, wherein said optical element exhibits a signal uniformity of about 1 decibel or less.

15. A unitary injection molded NXN star coupler with a signal mixing body having at its termini a plurality of injection molded cylindrical optical fibers integrally molded with said signal-mixing body, wherein said fibers are continuously transitioned from their ends of circular cross section to said body such that the optical path defined by said coupler is substantially constant and substantially free from lateral discontinuities.

16. The star coupler according to claim 15, wherein the angle said fibers form with the axis of said signal mixing body at the junction therewith is less than about 25 degrees.

17. The star coupler according to claim 16, wherein said angle is less than about 15 degrees.

18. The star coupler according to claim 17, wherein said angle is less than about 10 degrees.

19. The star coupler according to claim 15 wherein said fibers are separated from one another at their ends having an aggregate dimension larger than said signal mixing body and gradually converge to said signal mixing body by way of a curved optical path, wherein the bend loss due to the transition of any given fiber is less than about 0.2 decibels.

20. The star coupler according to claim 15, wherein said fibers have a diameter at their respective termini of from about 0.5 to about 2.0 millimeters.

* * * * *